E. KRUEGER.
SADDLE.
APPLICATION FILED JAN. 21, 1909.
920,347.
Patented May 4, 1909.
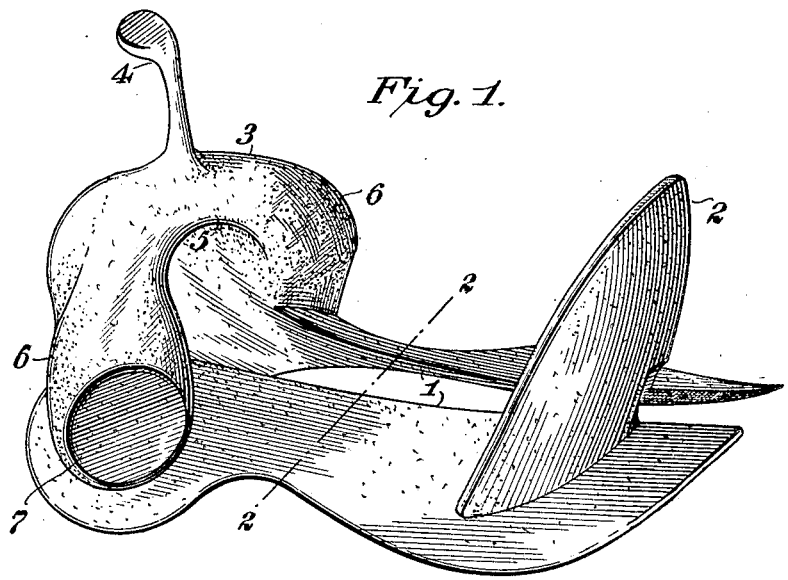
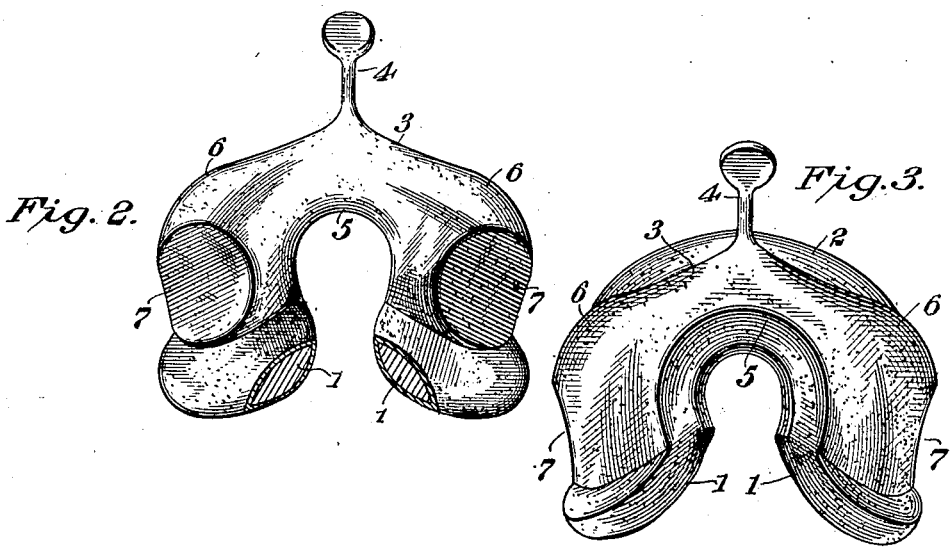
Witnesses
R. L. Norton.
L. B. Baker.
Inventor
Emil Krueger,
By Dudley, Browne & Phelps
Attorneys

UNITED STATES PATENT OFFICE.

EMIL KRUEGER, OF RAWLINS, WYOMING.

SADDLE.

No. 920,347.      Specification of Letters Patent.      Patented May 4, 1909.

Application filed January 21, 1909. Serial No. 473,553.

*To all whom it may concern:*

Be it known that I, EMIL KRUEGER, a citizen of the United States, residing at Rawlins, in the county of Carbon and State of Wyoming, have invented certain new and useful Improvements in Saddles, of which the following is a specification.

My invention relates to certain new and useful improvements in saddles, and the object of my invention is to improve the construction of the saddle whereby the rider will be given additional safeguards from being thrown from the horse.

With these and other objects in view my invention consists in certain constructions, combinations and arrangements of parts, the preferred form of which will be first described in connection with the accompanying drawings, and then the invention particularly pointed out in the appended claims.

Referring to the drawings wherein the same part is designated by the same reference numeral wherever it occurs, Figure 1 is a perspective view of a saddle embodying my invention. Fig. 2 is a section taken on line 2, 2 of Fig. 1, and Fig. 3 is a front elevation.

1, 1 designate a pair of spaced bars forming the seat of the saddle, the bars being connected together at the rear by the usual curved portion 2, which forms the back of the saddle. At the front the bars are connected together by the pommel 3 having the usual horn 4. The pommel is formed beneath the horn with the usual arch 5. The top portions of the pommel extend outward to form cheeks 6, and at their ends are concaved as shown at 7 between the cheeks and the bars 1. These concaved portions 7 fit the sides of the legs of the rider, and may be gripped by him to assist him in retaining his seat. The high cheek portions 6 also give the rider a firm brace against being thrown forward on the horse's neck.

I realize that considerable variation is possible in the details of construction and arrangement of parts without departing from the spirit of my invention, and I therefore do not intend to limit myself to the specific form shown and described.

What I claim as new and desire to secure by Letters Patent is—

1. A saddle having its pommel formed with high cheek portions on each side of its center and having its end portions extending inwardly from their upper edges toward the seat of the saddle, whereby the cheeks of the pommel extend over the legs of the rider and the ends of the pommel may be gripped thereby.

2. A saddle having its pommel formed with high cheek portions on each side of its center and having its end portions concaved whereby the cheeks of the pommel extend over the legs of the rider and the concaved end portions may be gripped thereby.

In testimony whereof I affix my signature in presence of two witnesses.

EMIL KRUEGER.

Witnesses:
    T. A. LUCKEFIND,
    CHAS. P. ROSS.